US012659374B2

(12) United States Patent
Jiménez et al.

(10) Patent No.: US 12,659,374 B2
(45) Date of Patent: Jun. 16, 2026

(54) LWM2M CLIENT REGISTRATION

(71) Applicant: Telefonaktiebolaget LM Ericsson (publ), Stockholm (SE)

(72) Inventors: Jaime Jiménez, Espoo (FI); Per Ståhl, Klagshamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 36 days.

(21) Appl. No.: 18/729,305

(22) PCT Filed: Jan. 17, 2022

(86) PCT No.: PCT/EP2022/050898
§ 371 (c)(1),
(2) Date: Jul. 16, 2024

(87) PCT Pub. No.: WO2023/134874
PCT Pub. Date: Jul. 20, 2023

(65) Prior Publication Data
US 2025/0097298 A1 Mar. 20, 2025

(51) Int. Cl.
*H04L 67/125* (2022.01)
*H04L 67/14* (2022.01)

(52) U.S. Cl.
CPC ............ H04L 67/125 (2013.01); H04L 67/14 (2013.01)

(58) Field of Classification Search
CPC ........ H04L 67/125; H04L 67/14; H04L 67/12
See application file for complete search history.

(56) References Cited

U.S. PATENT DOCUMENTS 10,938,955 B2 * 3/2021 Mathison ................ H04W 4/70
12,156,109 B2 * 11/2024 Keränen ............... H04L 67/142
(Continued)

FOREIGN PATENT DOCUMENTS

CN 109 982 355 A 7/2019
EP 0 946 068 A2 9/1999

OTHER PUBLICATIONS

Ravi et al., "Update Keep-Alive Mechanism LWM2M Client-Server", IPCOM000254376D, P.com Electronic Publication Date: Jun. 23, 2018 (Year: 2018).*
(Continued)

*Primary Examiner* — Oanh Duong
(74) *Attorney, Agent, or Firm* — Rothwell, Figg, Ernst & Manbeck, P.C.

(57) ABSTRACT

A method, performed by a lightweight machine-to-machine (LwM2M) server for registering a LwM2M client with the LwM2M server. The method comprises receiving a first message, from the LwM2M client, for registering the LwM2M client with the LwM2M server. The first message comprises a request for automatic reconfiguration data enabling reconfiguration of registration settings configured between the LwM2M server and the LwM2M client. The method further comprises transmitting, to the LwM2M client, the automatic reconfiguration data; receiving a second message from the LwM2M client comprising a request to re-register the LwM2M client with the LwM2M server and automatically reconfigure the registration settings based on the automatic reconfiguration data; and restoring the registration settings associated with the LwM2M client based on the second message. The present application also relates to a LwM2M server, LwM2M client and a computer program.

25 Claims, 6 Drawing Sheets

(56) References Cited

U.S. PATENT DOCUMENTS

| | | | | |
|---|---|---|---|---|
| 2011/0307694 | A1* | 12/2011 | Broustis | H04L 63/0884 |
| | | | | 713/169 |
| 2018/0166172 | A1 | 6/2018 | Fidone et al. | |
| 2021/0203733 | A1* | 7/2021 | Oittinen | H04L 67/12 |
| 2021/0409922 | A1* | 12/2021 | Keränen | H04W 4/70 |
| 2022/0174637 | A1* | 6/2022 | Zhang | H04W 4/70 |
| 2024/0388880 | A1* | 11/2024 | Novo Diaz | H04L 67/62 |

OTHER PUBLICATIONS

International Search Report and Written Opinion dated Sep. 12, 2022 in International Application No. PCT/EP2022/050898 (8 pages).
Rescorla, E. et al., "Connection Identifiers for DTLS 1.2 draft-ietf-tls-dtls-connection-id-12'", TLS, Internet-Draft, May 11, 2021 (36 pages).
Open Mobile Alliance, "Lightweight Machine to Machine Technical Specification: Core", OMA-TS-LightweightM2M_Core-V1_2-20201110-A, OMA SpecWorks, Nov. 2020 (154 pages).
Hartke, K., "Observing Resources in the Constrained Application Protocol (CoAP)", Internet Engineering Task Force (IETF), Request for Comments (RFC) 7641, Category: Standards Track, ISSN: 2070-1721, Sep. 2015 (30 pages).
Shelby, Z. et al., "The Constrained Application Protocol (CoAP)", Internet Engineering Task Force (IETF), Request for Comments (RFC) 7252, Category: Standards Track, ISSN: 2070-1721, Jun. 2014 (112 pages).

* cited by examiner

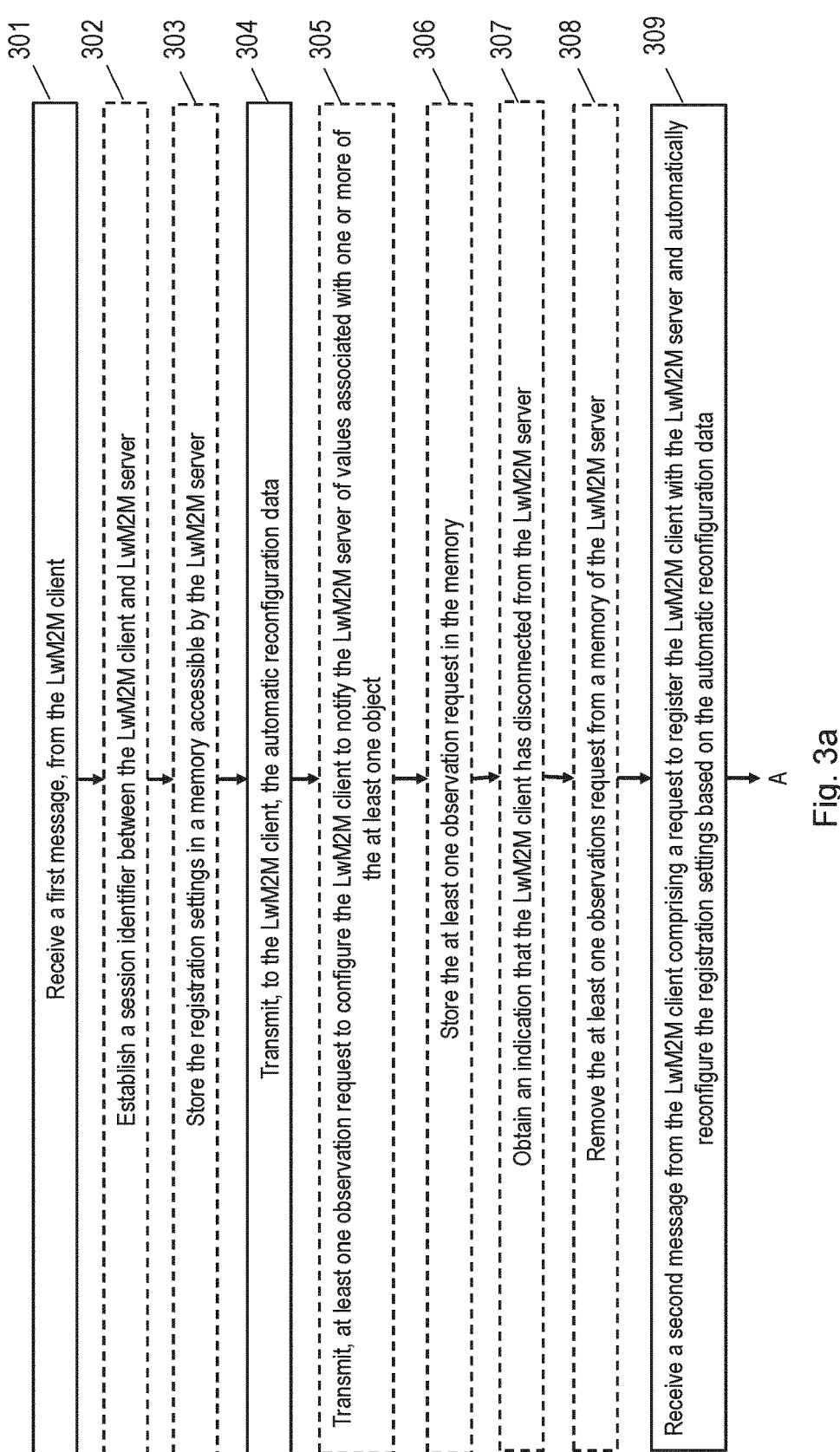

301 Receive a first message, from the LwM2M client

302 Establish a session identifier between the LwM2M client and LwM2M server

303 Store the registration settings in a memory accessible by the LwM2M server

304 Transmit, to the LwM2M client, the automatic reconfiguration data

305 Transmit, at least one observation request to configure the LwM2M client to notify the LwM2M server of values associated with one or more of the at least one object 306 Store the at least one observation request in the memory 307 Obtain an indication that the LwM2M client has disconnected from the LwM2M server 308 Remove the at least one observations request from a memory of the LwM2M server 309 Receive a second message from the LwM2M client comprising a request to register the LwM2M client with the LwM2M server and automatically reconfigure the registration settings based on the automatic reconfiguration data

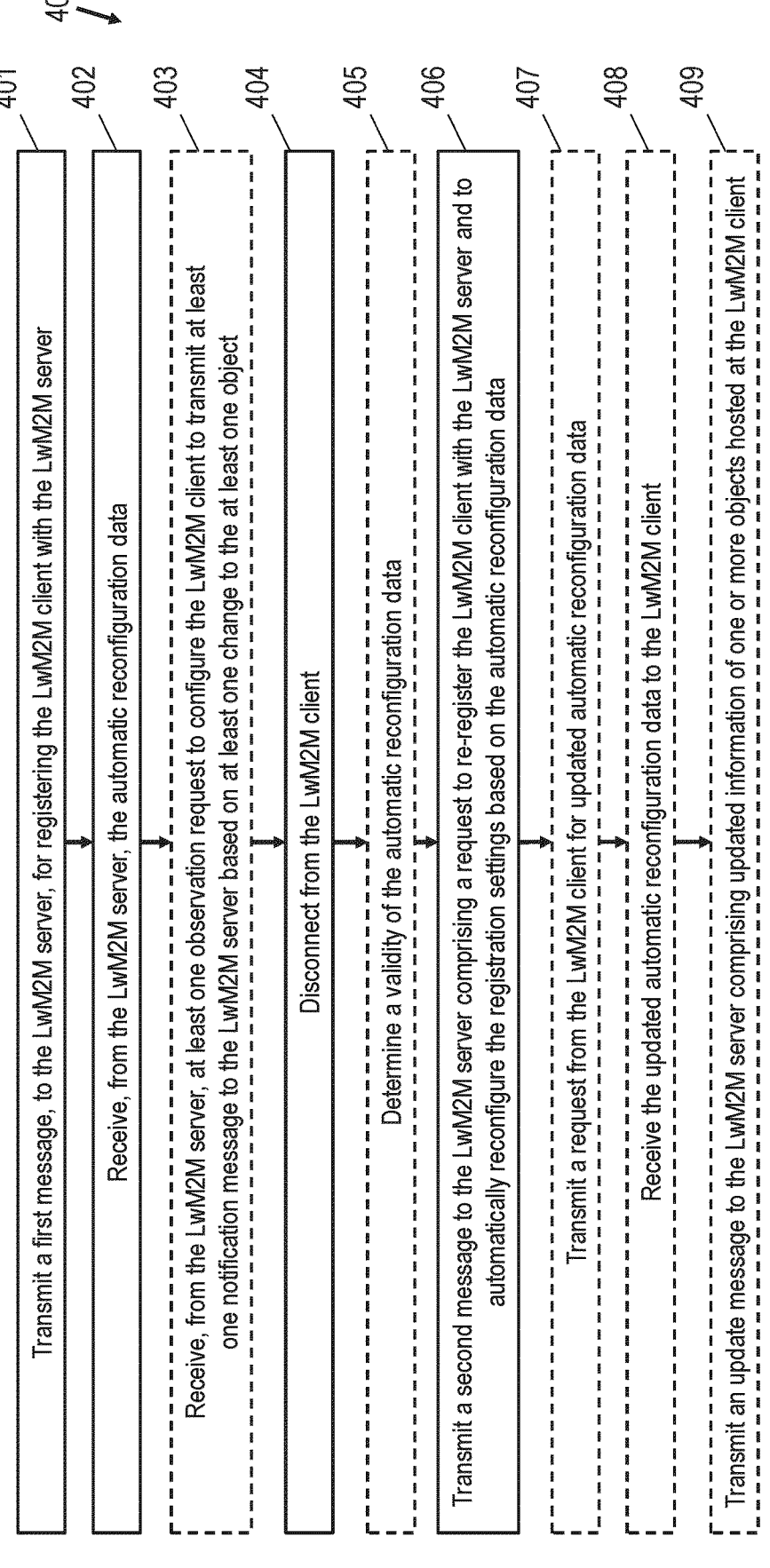

400

401   Transmit a first message, to the LwM2M server, for registering the LwM2M client with the LwM2M server 402   Receive, from the LwM2M server, the automatic reconfiguration data 403   Receive, from the LwM2M server, at least one observation request to configure the LwM2M client to transmit at least one notification message to the LwM2M server based on at least one change to the at least one object 404   Disconnect from the LwM2M client 405   Determine a validity of the automatic reconfiguration data 406   Transmit a second message to the LwM2M server comprising a request to re-register the LwM2M client with the LwM2M server and to automatically reconfigure the registration settings based on the automatic reconfiguration data 407   Transmit a request from the LwM2M client for updated automatic reconfiguration data 408   Receive the updated automatic reconfiguration data to the LwM2M client 409   Transmit an update message to the LwM2M server comprising updated information of one or more objects hosted at the LwM2M client

Fig. 4

LWM2M CLIENT REGISTRATION

CROSS REFERENCE TO RELATED APPLICATIONS

This application is a 35 U.S.C. § 371 National Stage of International Patent Application No. PCT/EP2022/050898, filed 2022 Jan. 17.

TECHNICAL FIELD

The present disclosure relates to a method for registering a LwM2M client with a LwM2M server. The present disclosure also relates to a LwM2M client, LwM2M server and a computer program.

BACKGROUND

Internet of Things (IoT) devices, and their associated communication protocols, have found wide-spread use in many applications. The Lightweight Machine-to-Machine (LwM2M) protocol is one such communication protocol that has enabled such IoT devices to communicate. The LwM2M protocol was developed from the Constrained Application Protocol (CoAP) developed for relatively simple IoT devices to communicate with each other and other, more complex devices.

In many CoAP and LwM2M communication systems, an IoT device may run an LwM2M client application and another IoT device may run a LwM2M server application. The LwM2M client may host a resource, such as a temperature sensor, and the LwM2M server may query the LwM2M client to transmit notification messages to the LwM2M server in response to a change associated with the resource e.g. the temperature increasing above a defined threshold. RFC 7641 specifies a protocol extension for CoAP, which enables such a process by allowing the LwM2M server to retrieve a representation of a resource hosted by a LwM2M client and keep this representation updated by the LwM2M server over a period of time.

FIG. 1 illustrates a signalling diagram 100 showing messages transmitted between a LwM2M client 120 and a LwM2M server 140 to receive notification messages based on an observe request. The LwM2M server 140 transmits an observation request 101 to the LwM2M client 120 using the Observe or Observe-Composite operations defined in the LwM2M protocol. The request comprises query instructions for the LwM2M client 120 to transmit a notification message to the LwM2M server 140 based on the resource. According to the query instructions, the LwM2M client 120 may thus transmit a notification message 102 to the LwM2M server 140 according to the Notify operation as defined in the LwM2M protocol.

In order to protect the confidentiality and integrity of information exchanged between LwM2M client and the LwM2M server, a security protocol may be established between the client and server, for example, Transport Layer Security (TLS), Datagram TLS (DTLS), or Object Security for Constrained RESTful Environments (OSCORE). These security protocols provide the possibility for mutual authentication between the LwM2M client and the LwM2M server. The client implementation of TLS, DTLS, or OSCORE in the device may reside within the LwM2M client or outside. For simplicity, and without loss of generality, in examples according to the present disclosure, the client implementation of TLS, DTLS, or OSCORE is contained within the LwM2M client if not explicitly stated otherwise.

The LwM2M protocol also dictates a Registration operation where a LwM2M client registers with a LwM2M server. After a LwM2M Device, running a LwM2M client, is turned on and the bootstrap procedure has been completed, the LwM2M Client must perform a "Register" operation to each LwM2M Server that manages the device or enables applications. The Registration operation is used to inform the LwM2M server of the existence of the LwM2M device and to enable device management and device communication after client registration. The registration operation includes providing information, to the LwM2M server, of supported LwM2M Objects and existing LwM2M Object Instances hosted at the LwM2M client. The Registration operation also enables the LwM2M server and LwM2M client to maintain the communication (e.g., transport mode, LwM2M Object information) and the registration session (e.g., registration lifetime) between the LwM2M device and the LwM2M server.

Upon successful registration, the LwM2M server may thus request observation of LwM2M client resources and the LwM2M client can send notifications when the resources change. The client may update its registration settings using the Update operation, for example if a resource hosted by the client is updated. The client uses the de-register operation to notify the LwM2M server that the LwM2M client is no longer available. For example, the LwM2M client device may power down or enter a sleep mode. In such examples, a new registration is required when the LwM2M client wakes up and reconnects to the LwM2M server.

SUMMARY

According to the LwM2M specification, when a new TLS/DTLS handshake is started, or in NoSec mode when the LwM2M Client IP address changes, the Client MUST register again to the LwM2M Server.

What is more, when the LwM2M server and LwM2M client lose the registration, the LwM2M protocol assumes that all observations are to be forgotten. The LwM2M Specification further indicates that:

"If the lifetime of a registration expires without receiving an update from the LwM2M Client the LwM2M Server will consider it a de-registration:

The LwM2M Server MUST remove the registration of that LwM2M Client and existing observations. If the LwM2M Client is unaware of the expiration, when the LwM2M Client performs a registration update the LwM2M Server will respond with an error.

Upon receipt of the error message, the LwM2M Client SHOULD reset its state and register again. The LwM2M Client MUST re-register ("Update" is not sufficient) to the LwM2M Server in order to be connected again, before initiating any further communication."

Thus, the LwM2M server needs to reset the observation requests per observing endpoint per resource in order to re-establish the previously ongoing observations. This places a large burden on communication between the client and server and can stall IoT services that need to use the data from the communication between the two entities. LwM2M devices that sleep most of the time and only periodically wake up to report data thus need to re-register each time they wake up and must also wait for the server to configure the observations before reporting data. This prolongs the time the LwM2M device needs to be awake thus draining power.

Even LwM2M devices that do not sleep may have issues with periodically needing to re-register due to the use of dynamically allocated IP addresses that are frequently re-allocated (e.g. every hour) in LwM2M applications. If the IP address expires, neither the LwM2M client nor the LwM2M Server may be aware of the expiry. As such, the LwM2M client may still send a Notify or Update operation to the LwM2M server, but if the LwM2M server does not recognise the new IP address, the LwM2M client is forced to register again.

The use of Connection IDs (CIDs) in LwM2M communication help to link an ongoing TLS session, or a DTLS session to a LwM2M client, at the LwM2M server, even though the LwM2M client may suddenly receive a new IP address. However, for a device that is in a sleep mode the majority of the time, a TLS or DTLS handshake is still required when the device wakes up where a new CID is established for the client, which means that the LwM2M client again has to register for the server to then to re-transmit observation requests to the client.

The above registration procedure thus places a large burden on both the LwM2M server and LwM2M client, in some examples.

It is the aim of the present disclosure to provide a method, a LwM2M server, a LwM2M client and a computer program product which at least partially address one or more of the challenges discussed above.

According to a first aspect there is provided a method, performed by a lightweight machine-to-machine (LwM2M) server for registering a LwM2M client with the LwM2M server. The method comprises receiving a first message, from the LwM2M client, for registering the LwM2M client with the LwM2M server. The first message comprises a request for automatic reconfiguration data enabling reconfiguration of registration settings configured between the LwM2M server and the LwM2M client. The method further comprises transmitting, to the LwM2M client, the automatic reconfiguration data; receiving a second message from the LwM2M client comprising a request to re-register the LwM2M client with the LwM2M server and automatically reconfigure the registration settings based on the automatic reconfiguration data; and restoring the registration settings associated with the LwM2M client based on the second message.

According to a second aspect there is provided a LwM2M server for registering a LwM2M client with the LwM2M server, configured to: receive a first message, from the LwM2M client, for registering the LwM2M client with the LwM2M server, wherein the first message comprises a request for automatic reconfiguration data enabling reconfiguration of registration settings configured between the LwM2M server and the LwM2M client. The LwM2M server is further configured to transmit, to the LwM2M client, the automatic reconfiguration data; receive a second message from the LwM2M client comprising a request to register the LwM2M client with the LwM2M server and automatically reconfigure the registration settings based on the automatic reconfiguration data; and restore the registration settings associated with the LwM2M client based on the second message.

According to a third aspect there is provided a method, performed by a LwM2M client for registering the LwM2M client with the LwM2M server. The method comprises: transmitting a first message to the LwM2M server for registering the LwM2M client with the LwM2M server, wherein the first message comprises a request for automatic reconfiguration data enabling reconfiguration of registration settings configured between the LwM2M server and the LwM2M client. The method further comprises receiving, from the LwM2M server, the automatic reconfiguration data; disconnecting from the LwM2M server; and transmitting a second message to the LwM2M server comprising a request to re-register the LwM2M client with the LwM2M server and to automatically reconfigure the registration settings based on the automatic reconfiguration data.

According to a fourth aspect there is provided a LwM2M client for registering with a LwM2M server. The LwM2M client is configured to: transmit a first message, to the LwM2M server, for registering the LwM2M client with the LwM2M server, wherein the first message comprises a request for automatic reconfiguration data enabling reconfiguration of registration settings configured between the LwM2M server and the LwM2M client. The LwM2M server is further configured to receive, from the LwM2M server, the automatic reconfiguration data; disconnect from the LwM2M server; and transmit a second message to the LwM2M server comprising a request to re-register the LwM2M client with the LwM2M server and to automatically reconfigure the registration settings based on the automatic reconfiguration data.

According to a fifth aspect there is provided a computer program comprising instructions which, when executed on at least one processor, cause the at least one processor to carry out a method according to any one of first aspect or the third aspect.

BRIEF DESCRIPTION OF THE DRAWINGS

For a better understanding of the present disclosure, and to show more clearly how it may be carried into effect, reference will now be made, by way of example, to the following drawings in which:

FIGS. 3a and 3b are flow charts illustrating a method performed by a LwM2M server;

FIG. 4 is a flow chart illustrating a method performed by a LwM2M client;

DETAILED DESCRIPTION

Figure 1:
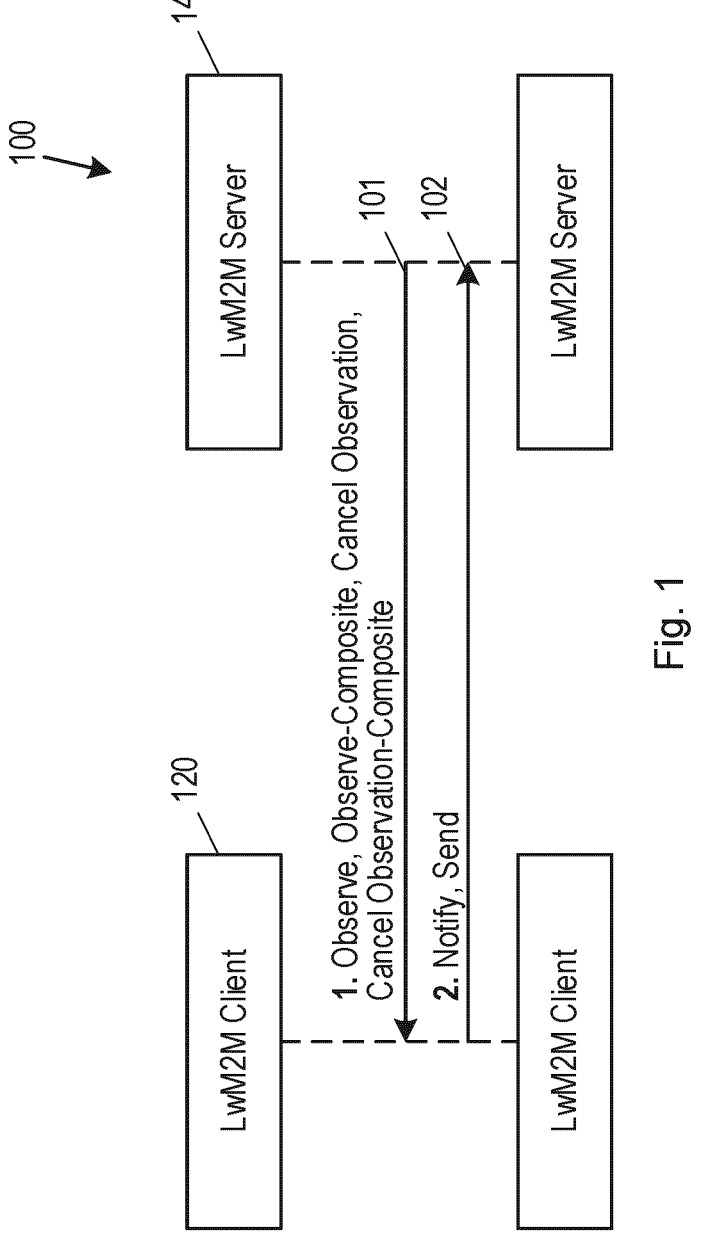
FIG. 1 is a signalling diagram illustrating a message flow between a LwM2M client and LwM2M server.

Examples according to the present disclosure relate to a method for the automatic reconfiguration of registration settings and observation requests between a LwM2M client and a LwM2M server following a period of disconnection between the LwM2M client and the LwM2M server. The automatic reconfiguration may thus enable the LwM2M server to reconfigure the registration settings for the LwM2M client, which may have been stored at the LwM2M server during the period of disconnection. The automatic reconfigure may thus also enable the LwM2M server to restore settings such that the LwM2M server can receive observations from the LwM2M client without re-transmitting the observation requests to the LwM2M server. In this way, signalling between the LwM2M client and LwM2M may be reduced thus reducing the computational burden on both entities.

In examples according to the present disclosure, during a first Registration operation between the LwM2M client and the LwM2M server, the LwM2M client may request to use automatic reconfiguration of registration settings and observation requests, configured between the LwM2M client and the LwM2M server in the first Registration operation, during a subsequent re-registration process. The LwM2M server may thus accept the request and provision the LwM2M client with automatic reconfiguration data for the automatic reconfiguration. In one example, the automatic reconfiguration data may comprise an indication that the automatic reconfiguration has been granted. The LwM2M server may additionally transmit one or more observation requests to the LwM2M client and receive notification messages from the LwM2M client. To later perform the automatic reconfiguration, the LwM2M server may thus be configured to store the registration settings and, if configured, the one or more observation requests in a memory. The registration settings and the one or more observation requests may, for example, be associated with an identifier of the LwM2M client.

The LwM2M client may thus disconnect from the LwM2M server. For example, the LwM2M client may transmit a de-register message to the LwM2M server or the LwM2M client may enter a sleep mode, without transmitting a de-register message. After a period of time, the LwM2M client may transmit a new Registration message to the LwM2M server requesting the automatic reconfiguration of the registration settings and, if configured, the observation requests at the LwM2M server based on the automatic reconfiguration data. The LwM2M server may thus restore at least the registration settings based on the request to use automatic reconfiguration. The LwM2M server may further restore any observation requests configured between the LwM2M server and LwM2M client. In some examples, the request to use automatic reconfiguration may also comprise an identifier of the LwM2M client and the LwM2M server may restore registration settings and observation requests from a memory by associating the stored registration settings and observation requests with the identifier of the LwM2M client.

In examples according to the present disclosure, an identifier of the LwM2M client may comprise the CoAP uniform resource identifier (URI), which may have a domain specifying a CoAP scheme and authority for example, coap:// mydevice.ericsson.com. However, in other examples, IP address based URIs may also be used, for example, coap:// [2001:db8:3::123]:5683. In the latter case, the addressing information associated with an observed state is updated based on the updated connection information whenever an IP address of a LwM2M client has changed. An example of an identifier of the LwM2M client may comprise a UUID. In other examples, as described in further detail below, an identifier of the LwM2M client may comprise long-term identifiers used by the client in security protocols such as TLS, DTLS, and OSCORE.

Figure 2:
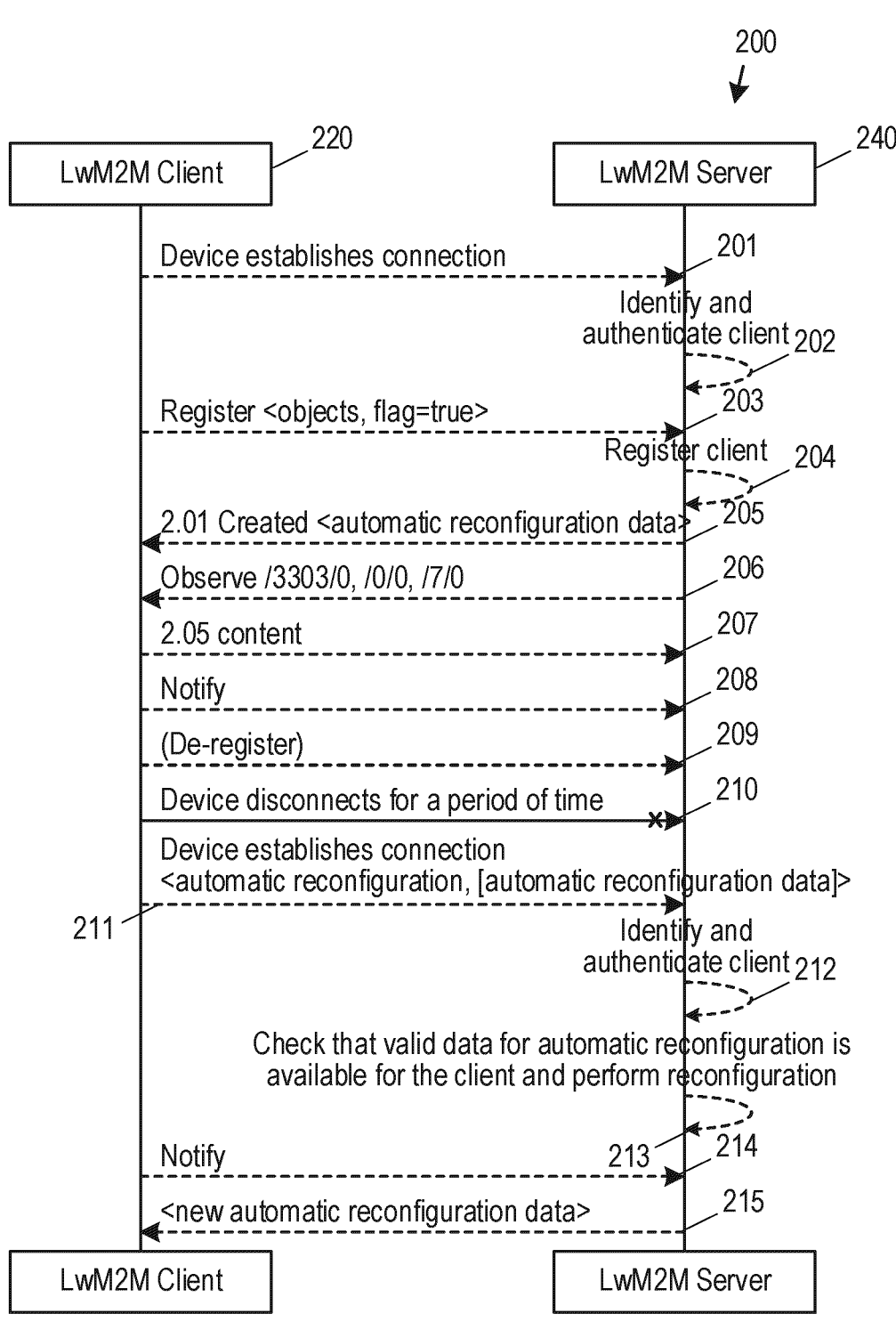
FIG. 2 is another signalling diagram illustrating a message flow between a LwM2M client and LwM2M server.

FIG. 2 is a signalling diagram 200 illustrating messages transmitted between a LwM2M client 220 and a LwM2M server 240.

In a first message 201, a LwM2M client 220 establishes a connection with a LwM2M server 240. The LwM2M client 220 provides an identifier of the LwM2M client 220 to the LwM2M server 240 in the first message 201. The LwM2M server 240 identifies and authenticates the LwM2M client, in step 202, based on the identifier and stored credentials for the authentication of the LwM2M client 220. Examples of such credentials stored at the LwM2M server 240 are a trusted root certificate for verifying the LwM2M client 220 certificate and a pre-shared key between the LwM2M client 220 and the LwM2M server 240.

In step 203, the LwM2M client 220 performs a Register operation to register with the LwM2M server. The LwM2M client 220 thus transmits a register message to the LwM2M server 240. The register message includes a list of LwM2M Objects supported by the LwM2M client 220 and a list of existing LwM2M Object instances maintained by the LwM2M client. In examples according to the present disclosure, references to "LwM2M Objects" refer to functionalities that are hosted by LwM2M client in accordance with LwM2M communication protocols, such as, resources which may be exposed to the LwM2M server. The register message further comprises a request, from the LwM2M client 220, to use automatic reconfiguration of registration settings and observation requests in following LwM2M interactions/communications between the LwM2M client 220 and the LwM2M server 240. For example, this may be indicated by an entry in the Register message by marking a flag associated with the automatic reconfiguration request as "true".

In step 204, the LwM2M server 240 registers the LwM2M client 220, where the LwM2M server 240 establishes registration settings between the LwM2M client 220 and the LwM2M server 240. Establishing the registration settings may comprise determining registration information from the register message in step 203, identifier of the LwM2M client, and connection information (e.g. IP address, CoAP scheme). The LwM2M server 240 may further accept the request to use automatic reconfiguration of registration settings and observation requests in interactions/communications between the LwM2M client 220 and the LwM2M server 240.

In order to be able to perform automatic reconfiguration in following LwM2M interactions/communications between the LwM2M client 220 and the LwM2M server 240, the LwM2M server 240 may be able to identify the LwM2M client and link the client to the established registration settings. In one example, step 201 comprises establishing a secure communication between the LwM2M client 220 and the LwM2M server 240. As will be described in more detail below, the secure communication may comprise one of a number of modes, for example (D) TLS or OSCORE. In these modes of communication, the LwM2M server 240 may thus be able to identify and authenticate the LwM2M client 220, and the identifier and credentials used in the authentication may, in addition to connection information such as IP address and earlier described identifiers of the LwM2M client, be part of or referenced from the established registration settings, such that, upon receiving a communication from the LwM2M client 220 in a future session, the server is able to associate the LwM2M client 220 with the established registration settings. The use of identifiers and credentials from the authentication will be described in more detail below. In this example, step 202 may be part of establishing the secure communication between the LwM2M client 220 and the LwM2M server 240.

As will be described in more detail below, in other examples, a secure communication mode may not be established between the LwM2M client 220 and LwM2M server 240, that may be used for the identification and authentication of the LwM2M client 220, such as a no security (NoSec) mode. In such examples, there is no authentication of the LwM2M client 220 performed in step 202. Identification of the client may then be based on an identifier of the LwM2M client 220 provided as part of the registration request in step 203 and included in the established registration settings.

Upon accepting the request to use automatic reconfiguration of registration settings and observation requests in following LwM2M interactions/communications between the LwM2M client 220 and the LwM2M server 240 between the LwM2M client 220 and the LwM2M server 240, the LwM2M server 240, in step 205, provides automatic reconfiguration data to the client 240. As will be described in more detail below, the communication in steps 203 to 205 and the automatic reconfiguration data may be configured in a number of formats and the request may in step 203 indicate the format which the LwM2M client 220 would prefer for the automatic reconfiguration data. The automatic reconfiguration data in step 204 may be provided in the format requested by the LwM2M client 220. In other examples, the LwM2M server 240 may provision the automatic reconfiguration data to the LwM2M client 220 in a format which is not the requested format.

The automatic reconfiguration data at least includes information indicating whether automatic reconfiguration is granted or not. As will be described in more detail below, the automatic reconfiguration data may further comprise an automatic reconfiguration session identifier, established between the LwM2M client 220 and the LwM2M server 240 in step 204.

The automatic reconfiguration data may also include a lifetime of the granted automatic reconfiguration data dictating a period for which the automatic reconfiguration data is valid. As will be described in more detail below, the automatic reconfiguration data may be updated by the LwM2M server 240, for example, upon an expiry of the lifetime. For example, the LwM2M server 240 may start a timer upon transmission of the automatic reconfiguration data to the LwM2M client 220. Upon expiry of the timer, the LwM2M server 240 may transmit updated automatic reconfiguration data to the LwM2M client 220. In other examples, the automatic reconfiguration data may not comprise a lifetime and may not need to be updated based on a lifetime.

The automatic reconfiguration data may contain credentials for identification and authentication and, in such examples, the automatic reconfiguration data may be used in a similar fashion to a token for the automatic reconfiguration. This is further described below.

The LwM2M server 240, for example, when registering the LwM2M client in step 204, further stores established registration settings comprising the list of supported LwM2M Objects and existing LwM2M Object instances and selected information from the automatic reconfiguration data needed by the LwM2M server 240 for the automatic reconfiguration of registration settings and observation requests. The LwM2M client 220 stores the received automatic reconfiguration data in response to receiving the automatic reconfiguration data in step 205.

In step 206, the LwM2M server 240 transmits one or more observation requests to the LwM2M client 220. The LwM2M server 240 further stores information of the transmitted observation requests for use in the automatic reconfiguration. The LwM2M client 220 stores the received observation requests and, in step 207, the LwM2M client reports data to the LwM2M server according to the configured observation requests.

The LwM2M client 220 may thus disconnect from the LwM2M server 240. In one example, in step 209, the device disconnects from the LwM2M server 240 by transmitting a de-register message to the LwM2M sever 240. For example, just before the LwM2M client enters sleep mode, the LwM2M client may transmit a de-register message to the LwM2M server 240. In other examples, the LwM2M client 220 may disconnect from the LwM2M server 240 without transmitting a de-register message. For example, the LwM2M client 220 may disconnect from the LwM2M server 240 in response to a re-boot operation at the LwM2M client 220. In step 210, the LwM2M client 220 is disconnected from the LwM2M server 240, and may not transmit any messages to the LwM2M server during this period.

In step 211, the LwM2M client 220 transmits a connection request, to the LwM2M server 240, to automatically reconfigure the registration of the LwM2M client 220 with the LwM2M server 240, based on the automatic reconfiguration data. For example, the LwM2M client 220 may leave a sleep mode of operation and enter a wake mode of operation. As described in more detail later, the IP address of the LwM2M client 220 may be dynamically allocated and may have changed such that the IP address of the connection request is different from the IP address registered by the LwM2M server 240. The LwM2M client 220 may verify that valid automatic reconfiguration data is stored at the LwM2M client 220, for example, the LwM2M client 220 may verify that a lifetime of the automatic reconfiguration data has not expired. If such valid automatic reconfiguration data is available to the LwM2M client 220, the LwM2M client 220 may thus transmit a request to the LwM2M server 240 to use automatic reconfiguration of registration settings and observation requests at the LwM2M server 240.

The request to use automatic reconfiguration, in step 211, may comprise an identifier of the LwM2M client 220. Such an identifier may, for example, be obtained from secure communication establishment performed as part of step 211 and step 212. The LwM2M server 240 may thus, in step 212, identify and authenticate the LwM2M client, in a similar manner described above in step 202.

In some examples, the LwM2M client 220 may transmit the automatic reconfiguration data to the LwM2M server 240. For example, the LwM2M server 240 may use the automatic reconfiguration data to authenticate the LwM2M client 220. Upon successful authentication of the LwM2M client 220, the LwM2M server 240 further verifies that the automatic reconfiguration data is valid, for example, the LwM2M server 240 may verify that a lifetime associated with the automatic reconfiguration data has not expired. Responsive to determining that the automatic reconfiguration data is valid, the LwM2M server 240 automatically re-registers the LwM2M client 220 and restores registrations settings configured for the LwM2M client 220 in step 204 and information of the observation requests transmitted to the LwM2M client 220 in step 206. For example, the LwM2M server 240 may retrieve such information from a memory of the LwM2M server 240 based on an identifier of the LwM2M client 220 that, for example, may have been determined upon successful authentication of the LwM2M client in step 212.

In some examples, if valid automatic configuration data is not available to the LwM2M client 220, the LwM2M client 220 initiates a conventional Register operation, to register with the LwM2M server 240.

In step 214, the LwM2M client 220 transmits a notification message 214 to the LwM2M server 240 based on one of the observation requests transmitted to the LwM2M client 220 in step 206. As the LwM2M client 240 has automatically restored the registration settings and information of the observation requests in step 213, the LwM2M server 240 is able to receive and accept the notification message 214.

In step 215, updated automatic reconfiguration data is transmitted from the LwM2M server 240 to the LwM2M client 220. The LwM2M client 220 may thus delete the automatic reconfiguration data previously transmitted in step 205 and use the updated reconfiguration data in a subsequent registration request.

In some examples, updated automatic reconfiguration data may be requested by the LwM2M client 220 when performing a Register, Update, or De-register operation and the updated automatic reconfiguration data may be transmitted from the LwM2M server 240 in response to such operations. In some examples, dedicated flags are provided in the Update and De-register operations for the LwM2M client 220 to indicate to the LwM2M server 240 whether new automatic reconfiguration data is requested. Alternatively, the LwM2M server 240 may be configured to issue and provide new automatic reconfiguration data to the LwM2M client 220, in response to a trigger, such as, when the lifetime of the existing automatic reconfiguration data is about to expire. In some examples, the LwM2M server 240 may write new automatic reconfiguration data to a new resource in an LwM2M Object, which is transmitted to the LwM2M client 220 or the new automatic reconfiguration data may be provided in the response to the LwM2M client sending data using the Send operation. In some examples, a combination of the LwM2M client 220 requesting new automatic reconfiguration data and the LwM2M server 240 configuring the automatic reconfiguration data may be performed.

As described above, in step 203, the LwM2M client 220 may request the format with which the LwM2M client 220 and LwM2M server 240 perform the automatic reconfiguration of the registration settings and observation requests.

In one example, the format for the automatic reconfiguration may comprise a transport layer security (TLS) extension or a datagram TLS (DTLS) extension. For example, referring again to FIG. 2, in step 201 and step 211, the LwM2M client 220 and LwM2M server 240 may establish secure communication using DTLS or TLS. The use of DTLS or TLS allows the LwM2M server 240 to authenticate the LwM2M client 220 in step 202 and step 212 using the credentials configured at the LwM2M client 220 and LwM2M server 240. For example, private and public keys, either in the form of raw public keys or certificates, or pre-shared keys may be used in the authentication. The registration settings in step 204 may, for example, be bound to a long-term identifier of the LwM2M client 220 used in the authentication in the (D) TLS session establishment in step 202 such that when doing the authentication in the (D) TLS session establishment in step 212 the (same) long-term identifier can be used in finding the registration settings to be automatically reconfigured. Examples of such long-term identifiers are an identifier in a certificate of the LwM2M client and a pre-shared key (PSK) identifier shared between the LwM2M client and the LwM2M server.

The indication to use automatic reconfiguration of registration settings and observation requests in step 211, may thus be provided from the LwM2M client 220 to the LwM2M server 240 as a TLS extension. An identifier of the LwM2M client 220 used during a LwM2M communication session may be obtained or derived from the (D) TLS secure communication such as a long-term identifier as described above.

In some examples, the identifier of the LwM2M client may be provided as part of the TLS extension. In some examples, the identifier of the LwM2M client may be provided as part of the automatic reconfiguration data. In other examples, the identifier of the LwM2M client may be retrieved from a LwM2M server database using an client identifier used in (D) TLS.

When using the TLS extension, in step 212, the LwM2M server may authenticate the LwM2M client 220 and obtain an identifier of the LwM2M client. The LwM2M server 240 may associate the identifier of the LwM2M client with the registration settings and the observation requests. The LwM2M server 240 may thus automatically re-register the LwM2M client 220 and restore the client registrations setting and information about the observation requests for the client by associating the LwM2M client 220 with the obtained identifier of the LwM2M client and thus the appropriate registration settings and observation requests. The LwM2M client 220 may thus directly provide data to the server using the Notify or Send operations.

In another example, the format for the automatic reconfiguration may comprise a NoSec mode of communication.

In the NoSec mode of communication, secure communication between the LwM2M client and the LwM2M server may be performed outside of LwM2M. In such examples, the automatic reconfiguration data may be used to identify and authenticate the LwM2M client. The automatic reconfiguration data may include the identifier of the LwM2M client, a challenge, for example, comprising a random value for replay prevention. The automatic reconfiguration data may further comprise the LwM2M client public key or hash. In some examples, the LwM2M client public key or hash, may be used as the identifier of the LwM2M client. For example, the identifier of the LwM2M client, public key, and/or the hash of the public key may have been provided to the LwM2M server as part of device initial registration or this information was configured out of band.

The automatic reconfiguration data may thus be provided to the LwM2M client and may be signed by the LwM2M server. To re-register with the LwM2M server, the LwM2M client, for example, in step 211, transmits the signed automatic reconfiguration data to the LwM2M server. The LwM2M server may identify and authenticate the LwM2M client (in step 212) based on a LwM2M signature applied to the automatic reconfiguration data by the LwM2M client. For example, the LwM2M client may, before providing the automatic reconfiguration data to the LwM2M server, sign the automatic reconfiguration data with a LwM2M client private key, thus indicting that the LwM2M client possesses the private key corresponding to the public key of the LwM2M client bound to the automatic reconfiguration data. In some examples, only the challenge or random value part of the automatic reconfiguration data may be signed by the LwM2M client. The LwM2M client signature is provided to the LwM2M server together with the automatic reconfiguration data in step 211. The LwM2M server may thus, in step 212, validate that the automatic reconfiguration data is provided from a legitimate LwM2M client by using the LwM2M client public key to verify the signature of the LwM2M client. To successfully authenticate the LwM2M client, the LwM2M server may also validate that the automatic reconfiguration data has not been tampered with. This validation may be performed in step 213 and is further described below. Successful validation of the client signature and automatic reconfiguration data may thus indicate to the server that the automatic reconfiguration data has been transmitted from a legitimate LwM2M client. The signed automatic reconfiguration data may thus be used by the LwM2M server in a similar manner to a token for the automatic reconfiguration to be performed. In some examples, the LwM2M client public key may be stored in the LwM2M server database or may be obtained from the automatic reconfiguration data.

In other examples, as an alternative to private and public keys, a symmetric key may be shared between the LwM2M client and the LwM2M server, which may be securely stored at each entity. The LwM2M client may then calculate a message authentication code (MAC) on the automatic reconfiguration data (or in some examples only the challenge or random value part of the automatic reconfiguration data) using the shared key and provide this MAC, along with the automatic reconfiguration data to the LwM2M server in step 211. The LwM2M server may thus, in step 212, authenticate the LwM2M client by verifying the MAC on the automatic reconfiguration data using the shared key. In order to successfully authenticate the LwM2M client, the LwM2M server may also validate the automatic reconfiguration data as further detailed below. In some examples, the identifier of the LwM2M client may be used to extract the correct shared key from a database of the LwM2M server.

In some examples, when using the NoSec mode of communication, the LwM2M client uses the Register operation transmitted in step 211 to trigger the authentication in step 212. The automatic reconfiguration data and the LwM2M client signature may thus be provided as part of the Register operation to the LwM2M server. The LwM2M server validates the received automatic reconfiguration data, for example, by comparing the received data to a cached valid automatic reconfiguration data for the LwM2M client stored in a LwM2M server database. Alternatively, the LwM2M server verifies the automatic reconfiguration data signature and verifies that the automatic reconfiguration data is valid. The LwM2M server may verify that the automatic reconfiguration data is valid by checking a time indication of the automatic reconfiguration data, sequence number automatic reconfiguration data or similar data by comparing the data to a cached value at the LwM2M server. The LwM2M server further verifies that the LwM2M client providing the automatic reconfiguration data is the client for which the automatic reconfiguration data was issued.

In some examples, when using the NoSec mode of communication, the security of the communication is sufficiently strong that presenting the automatic reconfiguration data in step 211 is taken as proof that the request for automatic reconfiguration is valid and has been received from a legitimate client. For example, the LwM2M communication in NoSec mode may be performed with sufficiently strong Layer 2 traffic encryption such that attackers are highly unlikely to obtain valid automatic reconfiguration data. The LwM2M server may thus identify the LwM2M client based on the received automatic reconfiguration data without authenticating the LwM2M client in step 212. In such examples, the LwM2M server 240 may thus restore the registration settings and observation requests in response to receiving the automatic reconfiguration data in step 211. In other examples, if the automatic reconfiguration data is signed by the LwM2M client, the LwM2M server may, in step 213, validate the signature before restoring the registration settings and observation requests.

In another example, the format for the automatic reconfiguration may comprise the LwM2M OSCORE mode of communication.

Referring again to FIG. 2, in steps 201 and 211, the LwM2M client 220 and LwM2M server 240 establish secure communication using OSCORE. The use of OSCORE allows the LwM2M server to authenticate the LwM2M client using pre-shared keys, which are negotiated for use with OSCORE for securing the communication between the two entities. In a similar manner to the (D) TLS case, the registration settings in step 204 may, for example, be bound to a long-term OSCORE identifier of the LwM2M client 220 used in the authentication in the OSCORE session establishment in step 202 such that when doing the authentication in the OSCORE session establishment in step 212 the (same) long-term identifier can used in finding the proper registration settings to be automatically reconfigured.

The indication to use automatic reconfiguration of registration settings and observation requests may be signaled in step 211 from the LwM2M client to the LwM2M server using, for example, a new CoAP option encrypted and integrity protected using OSCORE. The CoAP option may be empty e.g. contain no data, or alternatively an identifier of the LwM2M client or complete automatic reconfiguration data may be included as part of the CoAP option. The identifier of the LwM2M client may be obtained or derived from the OSCORE based secure communication e.g. a long-term OSCORE identifier of the LwM2M client, or may be provided as part of the CoAP option. The identifier of the LwM2M client may be provided as part of the automatic reconfiguration data if present, or may be retrieved from the LwM2M server database using the identifier of the LwM2M client used in OSCORE session.

In a similar manner to the (D) TLS extension format described above, the LwM2M server automatically re-registers the client and restores client registrations settings and information about the observation requests for the client upon discovering the indication to use automatic reconfiguration in the Registration message in step 211. The LwM2M server may perform such actions by associating the identifier of the LwM2M client obtained via OSCORE with the stored registration settings and observation requests.

Referring again to FIG. 2, as described above, in step 203 the LwM2M client 220 may request to use automatic reconfiguration of registration settings and observation requests in a subsequent registration operation and may request the format with which the automatic registration is configured. For example, the format may be any one of the (D) TLS, NoSec or OSCORE formats described above. In one example, in step 201, when the LwM2M client 220 establishes a connection with the LwM2M server 240, the LwM2M server 240 may dictate, to the LwM2M client 220, the security mode of communication, for example, (D) TLS, NoSec or OSCORE. As such, the LwM2M client 220 may request the format for the automatic reconfiguration based on the security mode dictated by the LwM2M server 240 in response to step 201.

As described above, upon receiving a Register operation from the LwM2M Client, the LwM2M Server may thus record the connection information of the registration message and associate this with stored registration settings and observation requests. In some examples, the connection information may comprise source IP address and port. However, as described above, LwM2M devices may use dynamically allocated IP addresses that are frequently re-allocated (e.g. every hour).

Thus, in some examples, the LwM2M server may also store additional information which may be associated with the stored registration settings and observation requests. As described above, in examples where a (D) TLS or OSCORE security mode is being used, the LwM2M server may also store a security context for the (D) TLS or OSCORE session including credentials and identifiers for use in (D) TLS or OSCORE. The security context is linked to the IP address and port as well as the registration settings and observation requests.

In some examples, the security context may also comprise session keys derived from credentials for the LwM2M client, which may for example be obtained in step 201 or step 202, as described above with reference to FIG. 2. The security context may also store connection identifiers, which may comprise a session identifier. In some examples, the data that may comprise the security context may be referred to as credentials. When a LwM2M client receives a new IP address the security context, such as (D) TLS or OSCORE connection identifier or session identifier, can be used to identify the associated registration settings and observation requests. The security context may thus be updated with the new IP address and port for a LwM2M client.

In some examples, a LwM2M client may wake up after sleeping, which has previously established a (D) TLS or OSCORE session with a LwM2M server, for example, in step 201. The LwM2M client may re-establish or resume the session, for example, by performing a (D) TLS handshake resumption. Alternatively, a completely new (D) TLS or OSCORE session is established between the LwM2M client and the LwM2M server. In both of these examples, a new connection identifier is established and may not be used to link the LwM2M client to the previously established registration setting and observation requests, in case the LwM2M client has a new IP address. Long-term identifiers and credentials for use in (D) TLS or OSCORE and/or credentials established in the session being resumed may thus be used to authenticate the client. In such examples, the registration settings and observation requests may be linked with previously established security context, such as (D) TLS or OSCORE identifiers and credentials. In other examples, the automatic reconfiguration data may comprise a mapping between the security context and an associated identifier of the LwM2M client. Such information may thus be included in the automatic reconfiguration data by the LwM2M server.

In some examples, the automatic reconfiguration data may comprise information of registration settings and a list of LwM2M Objects or LwM2M Object instances associated with the LwM2M client, stored by the LwM2M server.

In one example, such information may be included in the automatic reconfiguration data in the form of a cryptographic hash. Before the LwM2M client indicates to the LwM2M server to use automatic configuration, for example, prior to step 211, the LwM2M client may check the list of supported LwM2M Objects and existing LwM2M Object instances stored at the LwM2M server, based on the information in the automatic reconfiguration data. The LwM2M client then checks that the list of LwM2M Objects and LwM2M Object instances stored at the LwM2M server match the list of LwM2M Objects and LwM2M Object instances currently hosted at the LwM2M client. The LwM2M client may thus compute a hash of the list of supported LwM2M Objects and existing LwM2M Object instances at the client and check that the computed hash matches the hash in the automatic reconfiguration data. For example, the client may have performed a registration update, which may change the list of LwM2M Objects and LwM2M Object instances at the LwM2M client. By performing such a check, the LwM2M client can verify that the latest automatic reconfiguration data received from the LwM2M server accurately reflects the list of LwM2M Objects and LwM2M Object instances currently hosted at the LwM2M client.

If the automatic reconfiguration data is verified as accurately reflecting the current LwM2M list of LwM2M Objects and LwM2M Object instances, the LwM2M client 220 may thus transmit the request to use the automatic reconfiguration of registration settings and observation requests, for example, in step 211. If the LwM2M client determines that the automatic reconfiguration data does not accurately reflect the current list of LwM2M Objects and LwM2M Object instances, the LwM2M client can transmit an Update message to the LwM2M server, informing the LwM2M server of the updated list of LwM2M Objects or LwM2M Object instances. The update message may further comprise a request for updated automatic reconfiguration data. Based on the information in the update message, the LwM2M server may thus transmit updated automatic reconfiguration data to the LwM2M client.

In some examples, the LwM2M client may be configured to transmit information about the observation requests, stored at the LwM2M client, to the LwM2M server.

In one example, this information may be provided to the server as a cryptographic hash, where the hash is computed by the LwM2M client on the observation requests stored at the LwM2M client. The LwM2M server may thus validate, based on the received hash, that the observation requests stored at the LwM2M server correspond to those stored at the LwM2M client. For example, the server computes the hash of the observation requests stored at the LwM2M server and check that it matches the hash received from the LwM2M client. In some examples, for the (D) TLS, NoSec and OSCORE modes of communication described above, the hash of the observation requests, stored at the LwM2M client, may be delivered to the LwM2M server in the TLS extension, as part of the Register operation, and in a new CoAP option, respectively.

In some examples, upon receiving an indication that the LwM2M client has disconnected from the LwM2M server 240, for example as described in steps 209 above, the LwM2M server may remove the observation entries from a database or memory. In such examples, the automatic reconfiguration data may comprise the observation requests and the LwM2M server may restore the observation requests based on the information in the automatic reconfiguration data. In such examples, the automatic reconfiguration data is thus transmitted to the LwM2M server 240 when indicating to use automatic reconfiguration, for example as described with respect to step 211 above. In such examples, the LwM2M server 240 may thus verify the automatic reconfiguration data is legitimate. For example, the automatic reconfiguration data may be signed by the LwM2M server prior to its transmission to the LwM2M client, and the verification may be performed by verifying that the automatic reconfiguration data comprises a signature of the LwM2M server.

In another example, the LwM2M server may restore the observation requests based on information transmitted from the LwM2M client, but the information of the observation requests may not be provided as part of the automatic reconfiguration data. In such examples, the observation requests may thus be updated independently of issuing updated automatic reconfiguration data, which may be more computationally expensive than updating the observation requests alone.

The LwM2M client may thus provide the observation requests to the server, in addition to the automatic reconfiguration data, for example, when indicating to use automatic reconfiguration in step 211. In some examples, before accepting the observation requests, transmitted from the LwM2M client, the LwM2M server may verify the requests. In order to perform the verification, the LwM2M server may keep a hash of the active observation requests (e.g. in a compressed form) in a database of the LwM2M server. The LwM2M server may update the hash whenever the LwM2M server changes to the set of observation requests. Upon receiving the observation requests from the LwM2M client, the LwM2M server calculates the hash of the received observation requests and compares this hash to the stored hash.

In another example, instead of storing the hash of the currently active observation requests, the LwM2M server computes a signature of the currently active observation requests and provides the signature to the LwM2M client. For example, the signature may be provided to the LwM2M client every time observation requests are configured at the client, e.g., as part of step 206 described above. The signature may also be provided to the LwM2M client when the observation requests are updated. The client may thus store the signature and return the signature along with the observation request, to the server, for example in step 211. The server may thus verify the signature before restoring the observation requests. In another example, each observation request is signed by the LwM2M server upon its transmission to the LwM2M client, e.g., in step 206. The client may thus store the signature for each observation request and may return all signatures along with the observation requests, for example in step 211. The LwM2M server may thus verify each signature before accepting and restoring the associated observation request.

As described above, the automatic reconfiguration of the registration settings and observation requests may take various forms and, as such, the automatic reconfiguration data may take various forms and may be configured according to various different formats depending on the content of the automatic reconfiguration data.

In one example, the automatic reconfiguration data may be an indication that the request for the automatic reconfiguration has been granted by the LwM2M server. In another example, the automatic reconfiguration data may share some similar characteristics to a token comprising client information and other data signed by the LwM2M server, which is used by the LwM2M server for identification and authentication of the LwM2M client prior to reconfiguration. In such examples, the automatic reconfiguration data may take the form of an application level token such as a JSON Web Token (JWT) or CBOR Web Token (CWT).

In some examples, the automatic reconfiguration data may contain an automatic reconfiguration session identifier, which may be used by the LwM2M server to identify stored registration settings and observation requests configured between the LwM2M client and server. Unless hardcoded in the LwM2M client, the automatic reconfiguration data may also comprise an indication of a lifetime of the automatic reconfiguration before a new registration is required. Upon expiry of the automatic reconfiguration data lifetime, new automatic reconfiguration data with a new lifetime may be obtained.

As described above, the automatic reconfiguration data may also contain a LwM2M client or device identifier for identification of the LwM2M client or device. The automatic reconfiguration data may also comprise additional data for authentication of the LwM2M client or device at the LwM2M server. Such data may include a device or client public key and a random value (challenge). As described above, the LwM2M client/device identifier may be used to link DTLS, TLS or OSCORE identifiers used in the authentication of the LwM2M client/device, for example in step 201, to the identifiers used at LwM2M level/layer.

In some examples, the automatic reconfiguration data may be signed by the LwM2M server. In such examples, the server may thus validate the automatic reconfiguration data received from a LwM2M client, for example, in step 211, before the server uses the information for further processing. In some examples, if secure communication between the LwM2M server and the LwM2M client is not supported, to improve the security of the communication, the automatic reconfiguration data may be signed by the LwM2M server for use in a subsequent verification processes. Furthermore, in some examples, upon receiving signed automatic reconfiguration data from the LwM2M server, the LwM2M client may be configured to verify the server signature.

As further described above, the automatic reconfiguration data may also include a cryptographic hash of registration settings and observation requests (e.g. in compressed form) stored by the LwM2M server.

Figure 3B:
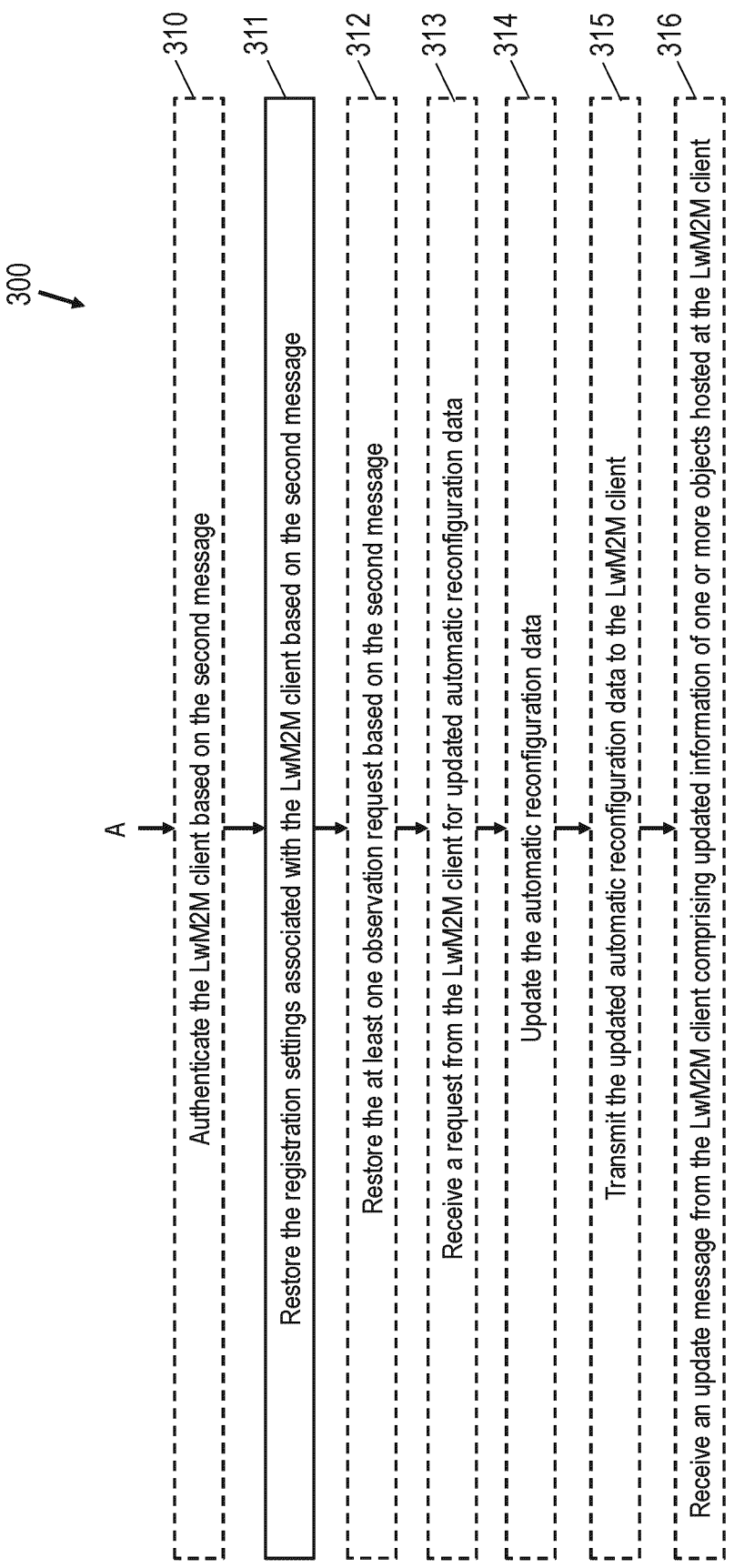

FIGS. 3a and 3b are flow charts illustrating a method 300 performed by a LwM2M server for registering a LwM2M client with the LwM2M server.

The method 300 comprises, in a first step 301, receiving a first message, from the LwM2M client for registering the LwM2M client with the LwM2M server. The first message comprises a request for automatic reconfiguration data enabling reconfiguration of registration settings configured between the LwM2M server and the LwM2M client. The first message may thus comprise a Registration operation message, for example as described above with respect to step 203.

The method 300 further comprises, in step 302, establishing a session identifier between the LwM2M client and LwM2M server. As described above, in some examples, the LwM2M server may establish a session identifier or determine a long-term identifier used in authentication of the LwM2M client for the communication session between the LwM2M client and the LwM2M server. For example, the session identifier or long-term identifier may be established according to the (D)TLS or OSCORE communication modes. The session identifier may thus comprise connection information. The LwM2M server may store registration settings and at least one observation request in a memory and associate the stored data with the session identifier or the long-term identifier. When the LwM2M client requests automatic reconfiguration of the registration settings and the observation requests, for example, in step 211 above, the LwM2M server may be configured to associate the LwM2M client with the registration settings and at least one observation request based on the session identifier or the long-term identifier.

In step 303, the method 300 further comprises storing the registration settings in a memory accessible by the LwM2M server. Storing the registration settings in the memory may comprise associating the registration settings associated with the LwM2M client with an identifier of the LwM2M client. The identifier may comprise a session identifier or a long-term identifier, as described above. In some examples, the memory may comprise a database maintained at the LwM2M server. In some examples, the memory may comprise a database maintained outside of the LwM2M server.

The method 300 further comprises, in step 304, transmitting, to the LwM2M client, the automatic reconfiguration data. As described above, the automatic reconfiguration data may be configured in various formats and may comprise different pieces of information depending on the format.

The method 300 further comprises, in step 305, transmitting, to the LwM2M client, at least one observation request to configure the LwM2M client to notify the LwM2M server of values associated with one or more LwM2M Objects hosted by the LwM2M client. In some examples, the first message may comprise information identifying at least one LwM2M object hosted at the LwM2M client. The LwM2M server may thus transmit the at least one observation request to the LwM2M client based on the information identifying the at least one LwM2M object hosted at the LwM2M client comprised in the first message. The method 300 may thus further comprise, in step 306, storing the at least one observation request in a memory accessible by the LwM2M server. The observation requests may thus be stored with the associated registration settings in the memory.

The method 300 thus further comprises, in step 307, obtaining an indication that the LwM2M client has disconnected from the LwM2M server. In some examples, obtaining the indication may comprise receiving a de-register message from the LwM2M client, for example, as described above in step 209. In other examples, the LwM2M server may consider the LwM2M client disconnected upon expiry of a time limit during which the LwM2M server did not receive any messages from the LwM2M client. The method 300 may thus further comprise, in step 308, removing the at least one observations request from the memory, accessible by the LwM2M server, upon obtaining the indication that the LwM2M client has disconnected from the LwM2M server.

As described above, in some examples, the observation requests maintained at the LwM2M client may be used by the LwM2M server to restore the observation requests. As further described above, this information may be transmitted to the LwM2M server in the request to re-register the LwM2M client, for example, as part of step 211. The information may be transmitted as part of the automatic reconfiguration data or may be transmitted separately in the registration message transmitted in step 211.

The method 300 further comprises, in step 309, receiving a second message from the LwM2M client comprising a request to re-register the LwM2M client with the LwM2M server and automatically reconfigure the registration settings based on the automatic reconfiguration data. The second message may thus comprise a Register operation message transmitted to the LwM2M server, for example, as described above in step 211.

Referring to FIG. 3*b*, the method 300 further comprises, responsive to receiving the second message, in step 310, authenticating the LwM2M client based on the second message. For example, an identifier of the LwM2M client may be associated with a session identifier or a long-term identifier, stored in a memory and associated with stored registration settings and observation requests. Thus, in one example, responsive to receiving the first message in step 301, the LwM2M server may authenticate the LwM2M client comprising determining the long-term identifier and authenticating the LwM2M client based on the second message may comprise determining a long-term identifier and associating the LwM2M client with stored registration settings based on the long-term identifier determined from the second message. In some examples the long-term identifier may thus further be used to restore registration settings associated with the LwM2M client by associating the registration settings with the long-term identifier.

The method 300 may thus further comprise in step 311, restoring the registration settings associated with the LwM2M client based on the second message. In some examples, restoring the registration settings may comprise retrieving the registration settings from the memory accessible by the LwM2M server. In some examples, the second message comprises an identifier of the LwM2M client and retrieving the registration settings from the memory comprises associating the registration settings associated with the LwM2M client with the identifier of the LwM2M client. For example, the second message may comprise a session identifier or connection identifier.

In some examples, the second message may further comprise a request to automatically reconfigure the at least one observation request based on the automatic reconfiguration data and the method 300 further comprises, in step 312, restoring the at least one observation request based on the second message. In some examples, the observation request may further be stored in the memory accessible by the LwM2M server and restoring the at least one observation request comprises retrieving the at least one observation request from the memory. In some examples, storing the at least one observation request in the memory comprises associating the at least one observation request with the identifier of the LwM2M client along with the registration settings and retrieving the at least one observation request from the memory comprises associating the at least one observation request with an identifier of the LwM2M client, received in the second message.

In some examples, the second message may comprise information identifying the at least one observation request, and restoring the at least one observation request may comprise restoring the at least one observation request based on the information identifying the at least one observation request comprised in the second message. As described above, in step 308, the server may remove the observation requests from a memory in response to obtaining an indication that the client has disconnected form the server, in step 307. As such, the information of the observation requests may be stored at the client and transmitted to the server in the second message when the client requests to re-register with the server.

The automatic reconfiguration data may thus comprise the information identifying the at least one observation request, and the automatic reconfiguration data may be signed by the LwM2M server. Restoring the at least one observation request based on the information in the automatic reconfiguration data may thus comprise verifying the signed automatic reconfiguration data and, upon successful verification, restoring at least one observation request. As described above, a signature of the server may be used to verify that the automatic reconfiguration data that was provisioned to the client in a previous communication session was not tampered with.

In some examples, storing the at least one observation request in step 306 may comprise storing in memory a cryptographic checksum of information identifying the at least one observation request, and restoring the at least one observation request, in step 310, comprises verifying that the received information identifying the at least one observation request in the second message matches the stored cryptographic checksum and, upon successful verification, restoring the at least one observation request. As described above, the server may verify that the observation requests stored in the server match those stored at the client by comparing a hash of the received observation request to the hash stored at the server.

Referring again to FIG. 3*b*, the method 300 may further comprise receiving a request from the LwM2M client for updated automatic reconfiguration data. The method 300 may thus further comprise, in step 314, updating the automatic reconfiguration data responsive to the request for the updated automatic reconfiguration data and, in step 315, transmitting the updated automatic reconfiguration data to the LwM2M client. In some examples, the server may receive a de-register message from the LwM2M client, which comprises the request for the updated automatic reconfiguration data.

In some examples, the method 300 may further comprise, in step 316, receiving an update message from the LwM2M client comprising updated information of one or more LwM2M Objects hosted at the LwM2M client and the update message may comprise the request for the updated automatic reconfiguration data. In other examples, the server may update the automatic reconfiguration, for example, upon expiry of a lifetime associated with the automatic reconfiguration data.

FIG. 4 is a flow chart illustrating process steps in a method 400 performed by a LwM2M client.

The method 400 comprises, in step 401, transmitting a first message to the LwM2M server for registering the LwM2M client with the LwM2M server. The first message comprises a request for automatic reconfiguration data enabling reconfiguration of registration settings configured between the LwM2M server and the LwM2M client. As described above, the first message may comprise a registration operation message, transmitted in step 201.

The method 400 further comprises, in step 402, receiving from the LwM2M server, the automatic reconfiguration data. The automatic reconfiguration data may comprise any one of the formats and data described above.

The method 400 further comprises, in step 403, receiving, from the LwM2M server, at least one observation request to configure the LwM2M client to notify the LwM2M server of values associated with the at least one LwM2M Object. In some examples the first message may thus comprise information identifying at least one LwM2M object hosted at the LwM2M client. The observation request may be received at the client in similar manner to that described above with respect to step 206.

The method 400 further comprises, in step 404, disconnecting from the LwM2M server. As described above, disconnecting from the server may comprise transmitting a de-register message to the server. In other examples, disconnecting form the server may comprise the client entering a sleep mode or rebooting.

The method 400 further comprises, in step 405, determining a validity of the automatic reconfiguration data. For example, determining the validity may comprise determining that a lifetime of the automatic reconfiguration data has not expired. The method 400 may thus further comprise, in step 406, transmitting a second message to the LwM2M server comprising a request to re-register the LwM2M client with the LwM2M server and to automatically reconfigure the registration settings based on the automatic reconfiguration data. In some examples, the second message may be transmitted responsive to determining that the automatic reconfiguration data is valid, in step 405. The second message may thus comprise a Register operation, for example, as described above in step 211.

The method 400 further comprises, in step 407, transmitting a request to the LwM2M server for the updated automatic reconfiguration data. The method 400 further comprises, in step 408, receiving updated automatic reconfiguration data from the LwM2M server. The updated automatic reconfiguration data may thus be received in response to the request. In some examples, disconnecting from the LwM2M server, in step 404, comprises transmitting a de-register message to the LwM2M server and the de-register message may comprise the request for the updated automatic reconfiguration data. In some examples, the request for the updated automatic reconfiguration data may be transmitted to the server upon expiry of a lifetime of the automatic reconfiguration data.

The method 400 further comprises, in step 409, transmitting an update message to the LwM2M server comprising updated information of one or more LwM2M Objects hosted at the LwM2M client. For example, the LwM2M Objects or LwM2M Object instances at the LwM2M client may be updated and the update may be notified to the server in an update message. The update message may further comprise the request for the updated automatic reconfiguration data.

In some examples, the automatic reconfiguration data may comprise information identifying the at least one observation request, and the second message, transmitted in step 406, may comprise the information identifying the at least one observation request. As described above, the LwM2M server may remove the observation requests from a memory in response to the LwM2M client disconnecting from the server and the second message may thus comprise information identifying the observation requests, which the server may use to restore the observation requests.

In some examples, the automatic reconfiguration data comprises an indication of stored information of one or more LwM2M Objects, hosted by the LwM2M client, stored by the LwM2M server. The method 400 may further comprise: comparing the stored information to the information of one or more LwM2M Objects hosted at the LwM2M client and responsive to determining that stored information corresponds to the information of one or more LwM2M Objects hosted at the LwM2M client, transmitting the second message in step 406. As described above, the LwM2M client may verify that the list of LwM2M Objects and LwM2M Object instances presently hosted by the client correspond to those stored at the LwM2M server, as indicated by the information in the automatic reconfiguration data. In some examples, the update message transmitted to the LwM2M server, in step 409, responsive to a determination that the stored information does not correspond to the information of one or more LwM2M Objects hosted at the LwM2M client.

As discussed above, the method 300 is performed by a LwM2M client and the method 400 is performed by a LwM2M server. The present disclosure provides a LwM2M device and LwM2M server which are adapted to perform any or all of the steps of the above discussed methods. The LwM2M client and LwM2M server may comprise constrained devices and/or logical or other functions.

Figures 5, 6:
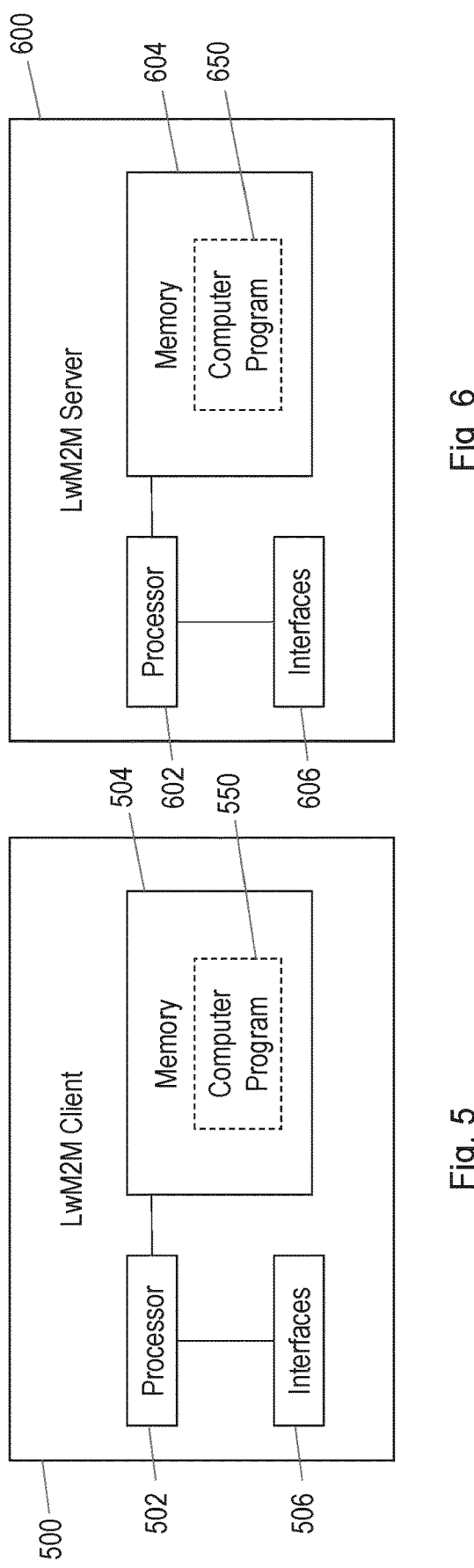
FIG. 5 is an example of a LwM2M client.
FIG. 6 is an example of a LwM2M server.

FIG. 5 is a block diagram illustrating a LwM2M client 500 which may implement the method 300 according to examples of the present disclosure, for example on receipt of suitable instructions from a computer program 550. Referring to FIG. 5, the LwM2M client 500 comprises a processor or processing circuitry 502, and may comprise a memory 504 and interfaces 506. The processing circuitry 502 is operable to perform some or all of the steps of the method 300 as discussed above with reference to FIG. 3. The memory 504 may contain instructions executable by the processing circuitry 502 such that the LwM2M client 500 is operable to perform some or all of the steps of the method 300. The instructions may also include instructions for executing one or more telecommunications and/or data communications protocols. The instructions may be stored in the form of the computer program 550. The interfaces 506 may comprise one or more interface circuits supporting wired or wireless communications according to one or more communication protocols. The interfaces 506 may support exchange of messages in accordance with examples of the methods disclosed herein, and may for example comprise one or more LwM2M interfaces.

FIG. 6 is a block diagram illustrating a LwM2M server 600 which may implement the method 400 according to examples of the present disclosure, for example on receipt of suitable instructions from a computer program 650. Referring to FIG. 6, the LwM2M server 600 comprises a processor or processing circuitry 602, and may comprise a memory 604 and interfaces 606. The processing circuitry 602 is operable to perform some or all of the steps of the method 400 as discussed above with reference to FIG. 4. The memory 604 may contain instructions executable by the processing circuitry 602 such that the LwM2M server 600 is operable to perform some or all of the steps of the method 400. The instructions may also include instructions for executing one or more telecommunications and/or data communications protocols. The instructions may be stored in the form of the computer program 650. The interfaces 606 may comprise one or more interface circuits supporting wired or wireless communications according to one or more communication protocols. The interfaces 606 may support exchange of messages in accordance with examples of the methods disclosed herein, and may for example comprise one or more LwM2M interfaces.

Examples of the present disclosure thus enable the automatic reconfiguration of registration settings and observation requests, configured between a LwM2M client and LwM2M server in response to a first registration operation. The automatic reconfiguration thus allows the efficient reconfiguration of the observation requests, which avoids the LwM2M server re-transmitting each observation request to the LwM2M client. Examples according to the present disclosure thus result in reduced signalling between the LwM2M client and server, thus reducing the computational burden on both the LwM2M client and server.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed by a lightweight machine-to-machine (LwM2M) server, for registering a LwM2M client with the LwM2M server, the method comprising:

receiving a first message, from the LwM2M client, for registering the LwM2M client with the LwM2M server, wherein the first message comprises a request for automatic reconfiguration data enabling reconfiguration of registration settings configured between the LwM2M server and the LwM2M client;

transmitting, to the LwM2M client, the automatic reconfiguration data;

receiving a second message from the LwM2M client comprising a request to re-register the LwM2M client with the LwM2M server and automatically reconfigure the registration settings based on the automatic reconfiguration data; and restoring the registration settings associated with the LwM2M client based on the second message.

2. The method of claim 1, further comprising storing the registration settings in a memory accessible by the LwM2M server, wherein restoring the registration settings comprises retrieving the registration settings from the memory.

3. The method of claim 2, wherein storing the registration settings in the memory comprises associating the registration settings associated with the LwM2M client with an identifier of the LwM2M client; wherein the second message comprises the identifier of the LwM2M client; and retrieving the registration settings from the memory comprises associating the registration settings associated with the LwM2M client with the identifier of the LwM2M client.

4. The method of claim 1, further comprising responsive to receipt of the first message:

establishing a session identifier between the LwM2M client and LwM2M server; wherein the automatic reconfiguration data comprises the session identifier; and wherein the second message comprises the session identifier.

5. The method of claim 1, wherein the first message comprises information identifying at least one LwM2M object hosted at the LwM2M client;

the method further comprises transmitting, to the LwM2M client, at least one observation request to configure the LwM2M client to notify the LwM2M server of values associated with one or more of the at least one LwM2M object;

the second message further comprises a request to automatically reconfigure the at least one observation request based on the automatic reconfiguration data; and restoring the registration settings associated with the LwM2M client based on the second message further comprises restoring the at least one observation request based on the second message.

6. The method of claim 5, further comprising storing the at least one observation request in a memory, wherein restoring the at least one observation request comprises retrieving the at least one observation request from the memory.

7. The method of claim 5, wherein the second message comprises data from the LwM2M client as a response to the at least one observation request.

8. The method of claim 5, further comprising:

obtaining an indication that the LwM2M client has disconnected from the LwM2M server;

removing the at least one observations request from a memory upon obtaining the indication; and wherein the second message comprises information identifying the at least one observation request, and restoring the at least one observation request comprises restoring the at least one observation request based on the information identifying the at least one observation request comprised in the second message.

9. The method of claim 8, wherein the automatic reconfiguration data comprises the information identifying the at least one observation request, and wherein the automatic reconfiguration data is signed by the LwM2M server and wherein restoring the at least one observation request comprises verifying the signed automatic reconfiguration data and, upon successful verification, restoring at least one observation request.

10. The method of claim 9, further comprising storing in memory a cryptographic checksum of information identifying the at least one observation request, and wherein restoring the at least one observation requests comprises verifying that the received information identifying the at least one observation request in the second message matches the stored cryptographic checksum and, upon successful verification, restoring the at least one observation request.

11. The method of claim 1, further comprising responsive to receiving the second message, authenticating the LwM2M client based on the second message; and responsive to authenticating the LwM2M client, restoring the registration settings associated with the LwM2M client.

12. The method of claim 1, further comprising:
receiving a request from the LwM2M client;
updating the automatic reconfiguration data responsive to the request; and
transmitting the updated automatic reconfiguration data to the LwM2M client, wherein
the request is a de-register message, and
the de-register message provides an indication to the LwM2M server that the LwM2M client is disconnecting.

13. A lightweight machine-to-machine (LwM2M) server for registering a LwM2M client with the LwM2M server, the LwM2M server comprising:
memory; and
processing circuitry, wherein the LwM2M server is configured to:
receive a first message, from the LwM2M client, for registering the LwM2M client with the LwM2M server, wherein the first message comprises a request for automatic reconfiguration data enabling reconfiguration of registration settings configured between the LwM2M server and the LwM2M client;
transmit, to the LwM2M client, the automatic reconfiguration data;
receive a second message from the LwM2M client comprising a request to register the LwM2M client with the LwM2M server and automatically reconfigure the registration settings based on the automatic reconfiguration data; and
restore the registration settings associated with the LwM2M client based on the second message.

14. A method, performed by a LwM2M client for registering the LwM2M client with the LwM2M server, the method comprising:
transmitting a first message to the LwM2M server for registering the LwM2M client with the LwM2M server, wherein the first message comprises a request for automatic reconfiguration data enabling reconfiguration of registration settings configured between the LwM2M server and the LwM2M client;
receiving, from the LwM2M server, the automatic reconfiguration data;
disconnecting from the LwM2M server; and
transmitting a second message to the LwM2M server comprising a request to re-register the LwM2M client with the LwM2M server and to automatically reconfigure the registration settings based on the automatic reconfiguration data.

15. The method of claim 14 further comprising determining a validity of the automatic reconfiguration data; and, responsive to determining that the automatic reconfiguration data is valid, transmitting the second message.

16. The method of claim 15 wherein determining the validity of the automatic reconfiguration data comprises determining whether a lifetime of the automatic reconfiguration data has expired.

17. The method of claim 14, further comprising receiving updated automatic reconfiguration data from the LwM2M server.

18. The method of claim 17, further comprising transmitting a request to the LwM2M server for the updated automatic reconfiguration data.

19. The method of claim 18, wherein disconnecting from the LwM2M server comprises transmitting a de-register message to the LwM2M server; and wherein the de-register message comprises the request for the updated automatic reconfiguration data.

20. The method of claim 18, further comprising transmitting an update message to the LwM2M server comprising updated information of one or more LwM2M objects hosted at the LwM2M client; wherein the update message further comprises the request for the updated automatic reconfiguration data.

21. The method of claim 14, wherein the automatic reconfiguration data comprises an indication of stored information of one or more LwM2M objects, hosted by the LwM2M client, stored by the LwM2M server; and the method further comprises:
comparing the stored information to the information of one or more LwM2M objects hosted at the LwM2M client; and
responsive to determining that stored information corresponds to the information of one or more LwM2M objects hosted at the LwM2M client, transmitting the second message.

22. The method of claim 14, wherein the first message comprises information identifying at least one LwM2M object hosted at the LwM2M client; and the method further comprises receiving, from the LwM2M server, at least one observation request to configure the LwM2M client to notify the LwM2M server of values associated with one or more of the at least one LwM2M object; and
wherein the second message further comprises a request to automatically reconfigure the at least one observation request based on the automatic reconfiguration data.

23. The method of claim 22, wherein the automatic reconfiguration data comprises information identifying the at least one observation request, and the second message comprises the information identifying the at least one observation request.

24. The method of claim 14, wherein the automatic configuration data comprises a session identifier established between the LwM2M client and the LwM2M server; and wherein the second message comprises the session identifier.

25. A lightweight machine-to-machine (LwM2M) client for registering with a LwM2M server, the LwM2M client comprising:
memory; and
processing circuitry, wherein the LwM2M client is configured to:
transmit a first message, to the LwM2M server, for registering the LwM2M client with the LwM2M server, wherein the first message comprises a request for automatic reconfiguration data enabling reconfiguration of registration settings configured between the LwM2M server and the LwM2M client;
receive, from the LwM2M server, the automatic reconfiguration data;
disconnect from the LwM2M server; and
transmit a second message to the LwM2M server comprising a request to re-register the LwM2M client with the LwM2M server and to automatically reconfigure the registration settings based on the automatic reconfiguration data.

\*   \*   \*   \*   \*